Inventor:
Ferdinand H. Mullersman,
by Carl O. Thomas
His Attorney.

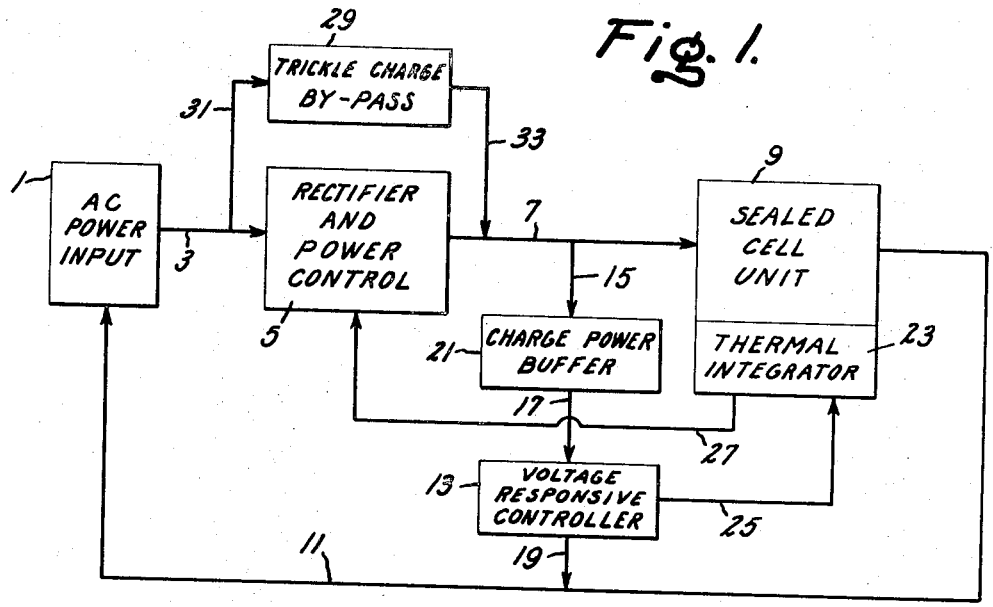
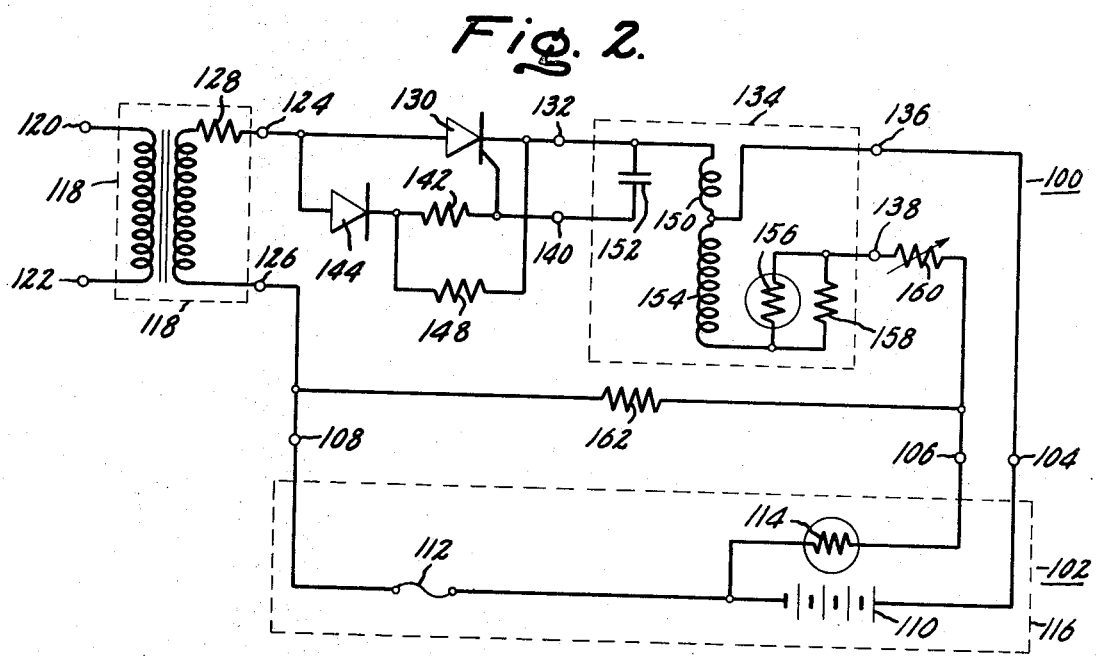

Inventor:
Ferdinand H. Mullersman,
by Carl O. Thomas
His Attorney.

United States Patent Office 3,531,706
Patented Sept. 29, 1970

3,531,706
RAPID CHARGE RATES FOR SEALED CELLS
Ferdinand H. Mullersman, Gainesville, Fla., assignor to General Electric Company, a corporation of New York
Filed Apr. 28, 1967, Ser. No. 634,562
Int. Cl. H02j 7/02
U.S. Cl. 320—20                                    21 Claims

ABSTRACT OF THE DISCLOSURE

In a charger for a secondary battery of electrochemical cells, wherein pulsed D-C current is supplied to the battery at a rapid charge rate, and a trickle charge current may be supplied at a lower rate, a novel controlling circuit provides for cut off of the rapid charge rate. A signal-responsive controller provided with switch means, which may, for example, be a magnetic-flux controlled reed switch or a solid-state controlling circuit, senses the temperature-compensated battery voltage only during periods of zero charge current and acts, also only during periods of zero charge current, to terminate the flow of high charge rate current as the battery reaches nearly full voltage. A first temperature compensating element having a temperautre sensor located in thermally conductive relation with the battery compensates battery voltage sensed for the actual temperature of the battery and modifies the sensed battery voltage at which the control circuit is activated to operate the switch means. According to another feature of the invention, a second temperature compensating element serves to adjust line voltage for temperature-related variations.

My invention relates to a sealed cell unit to a device for rapidly charging the unit, and to the sealed cell unit and charging device in combination.

Sealed cells and batteries have come into wide usage because of their attitude insensitivity and because of their electrolyte stability, which eliminates the necessity of servicing. A long standing barrier to the general use of sealed cell constructions has been that such cells produce gases internally on overcharge capable of rupturing the cell casing, thus producing a hazard to both personnel and equipment. The recent commercialization of sealed cell constructions is attributable to the development of techniques for allowing sealed cells to withstand even prolonged overcharge, provided the overcharge rate is maintained at a low level.

This has resulted in the wide spread usage of sealed cell units in combination with "trickle chargers"—that is, chargers which continuously supply a low rate of charge. Such chargers are quite suitable for applications in which a sealed cell is used only at infrequent intervals or is called upon to deliver only small amounts of power. In such instance the time that a sealed cell must remain on charge is no substantial disadvantage; however, there are many applications where the use of sealed cells has been considered practically prohibited by the requirement of slow charge resulting in prolonged cell residence in the charging circuit.

One possible alternative to the trickle charging of sealed cell units is suggested by Grafham in commonly assigned Pat. No. 3,301,724, issued Mar. 21, 1967. Grafham discloses a regulated cell charger which, although not specifically built for charging sealed cells, could be utilized in combination with sealed cells. Grafham discloses a circuit for rapidly charging a cell unit to a predetermined potential level and for subsequently completing charge of the cell unit by the use of a trickle charge. Accordingly, the circuits of Grafham could be applied to sealed cell uints, provided that rapid charge was terminated substantially below full charge.

It is an object of my invention to provide new and unobvious circuits for rapidly charging sealed cell units to very near full charge.

It is another object to provide such circuits capable of controlling the rapid charge rate as a function of cell temperature as well as of cell voltage.

It is still another object to provide such circuits capable of discriminating between cell voltage and applied voltage in monitoring and controlling the rapid charge rate.

It is an additional object to provide a sealed cell unit having means to correct for variations in the maximum charge level to which a unit may be rapidly charged.

In the drawings:

FIG. 1 is a schematic block diagram illustrating the operation of the invention;

FIG. 2 is a circuit diagram illustrating one specific embodiment of the invention;

FIG. 3 shows a circuit diagram illustrating the manner in which a full wave rectifier can be incorporated into the circuit of FIG. 2;

Figure 4:
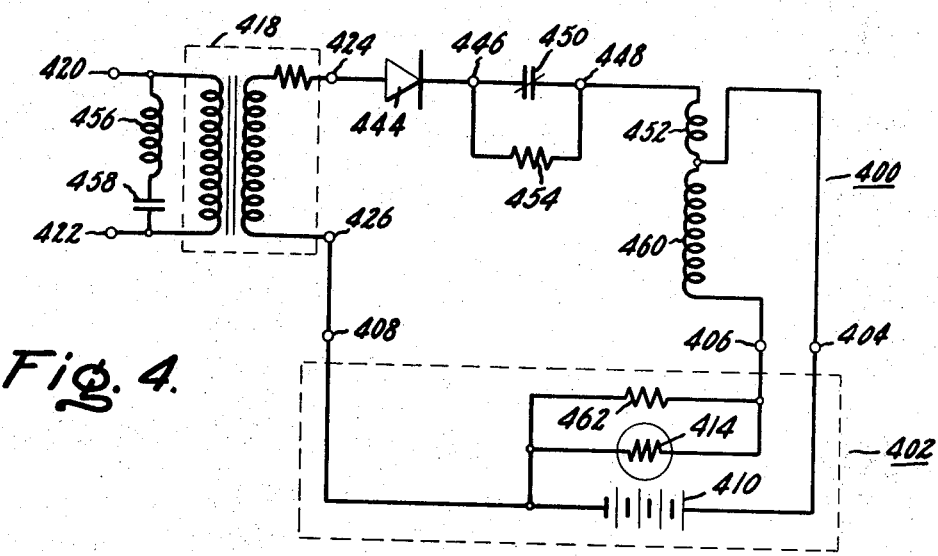
FIG. 4 is a circuit diagram illustrating an alternate to the embodiment of FIG. 2.

The rapid charging of sealed cell units to a point approaching full charge according to my invention can best be appreicated with reference to the schematic diagram illustrated in FIG. 1. The A-C power input 1 delivers electrical power to the rectifier and power control 5. Pulsating D-C power is then delivered to one terminal of the sealed cell unit 9 as indicated by arrow 7. The arrow 11 schematically illustrates the electrical connection between the A-C power input and the remaining terminal of the sealed cell unit. A voltage responsive controller 13 is connected in shunt with the power input and across the terminals of the sealed cell unit as indicated by arrows 15, 17, and 19. The voltage responsive controller functions to deliver a signal to the power control upon sensing a predetermined potential across its terminals.

It is a specific feature of my invention to insure that the voltage responsive controller is responsive to the potential exhibited by the sealed cell unit rather than merely sensing the potential applied across the terminals of the sealed cell unit during charge. To accomplish this, a charge power bufler 21 is electrically related to the voltage responsive controller. The charge power buffer insures that transient circuit potential peaks which may result from charge current pulses through the impedance represented by the sealed cell unit or its connectors are not sensed across the voltage responsive controller causing it to prematurely sense the predetermined potential and thereby prematurely signal the power control to end rapid charge.

It is another feature of my invention that the potential at which a signal is suppiled to the power control to terminate rapid charge is not merely a function of the potential across the terminals of the sealed cell unit. The cell potential at which a signal is given to the power control is also varied as a function of the temperature of the sealed cell unit. The thermal integrator 23 is shown thermally coupled to the sealed cell unit to account for control of this parameter. The thermal integrator is preferably contained within the sealed cell unit to form a portion thereof. The arrows 25 and 27 extending between the voltage responsive controller and the thermal integrator and between the thermal integrator and the power control, respectively, are intended merely to schematically indicate an electrical influence of the thermal integrator on the voltage responsive controller. Similar observation is applicable to the location of the charge power buffer. A variety of electrical relationships are contemplated and are specifically disclosed below.

As an optional feature, a trickle charge by-pass 29 together with arrows 31 and 33 are intended to indicate a provision for continuous low rate overcharge of the sealed cell unit. This feature is, of course, restricted in application to those sealed cell units capable of withstanding prolonged low rate overcharge without damage.

A specific embodiment of my invention is illustrated in FIG. 2, which is directed to a circuit diagram showing a rapid charging device 100 and a sealed cell unit 102 electrically connected through common terminals 104, 106, and 108.

The sealed cell unit is shown comprised of a plurality of series related rechargeable cells 110 connected between positive terminal 104 and negative terminal 108 in series with a fuse 112. A thermistor 114 is electrically connected between the negative terminal 108 and the monitoring terminal 106. It is immaterial whether the connection is in series or shunt with the fuse. The housing of the sealed cell unit is schematically indicated at 116. It is noted that both the thermistor and fuse lie within the sealed housing. Mounting these elements within the housing with the cells not only provides the desired thermally conductive relation with the cells but also minimizes the likelihood of significant variations between the temperature sensed by the thermistor and the fuse and the temperature actually reached by the cells in any given construction.

The rapid charging device is adapted to be connected to a source of A-C power, such as 110 volt, 60 c.p.s. line current. To accomplish this a voltage transformer 118 is provided having input terminals 120 and 122 for connection to an A-C input source and output terminals 124 and 126, which serve as a power source for the remainder of the circuit. The transformer is chosen to provide a high impedance, schematically represented by the resistance 128, so as to reduce the effect of line voltage variations on output. The output terminal 126 is connected to negative terminal 108.

The terminal 124 is electrically connected to the anode lead of a silicon controlled rectifier (hereinafter referred to by the initials SCR) 130. The cathode lead of the SCR is connected to rapid charge input terminal 132 of reed switch unit 134. The reed switch unit is also provided with a rapid charge output terminal 136, a shunt coil terminal 138, and a shunt contact terminal 140. The shunt contact terminal is connected to the gate lead of the SCR. The shunt contact terminal and the gate lead are also connected to the anode lead of the SCR through resistance 142 and rectifier 144. An alternate shunt flow path between the anode and cathode leads of the SCR is provided by an electrical connection between the cathode lead of the SCR and the cathode lead of the rectifier. A resistance 148 is provided in this alternate shunt flow path.

The reed switch unit is comprised of a current coil 150 connected electrically across the rapid charge input and output terminals. The magnetic flux produced by the current coil influences the opening and closing of reed switch contacts 152 electrically connected between the rapid charge input terminal and the shunt contact terminal. A voltage coil 154 is provided which is wound to produce a magnetic flux opposing the flux of the current coil. The voltage coil is electrically connected between the rapid charge output terminal and the shunt coil terminal in series with a shunt related thermistor 156 and resistance 158, which together compensate for any temperature related flux variations in the voltage coil. The rapid charge output terminal is connected to the positive terminal 104 while the shunt coil terminal is connected to the monitoring terminal 106 through a variable resistance 160. A resistance 162 is electrically connected between the negative and monitoring terminals.

If it were desired to quickly charge a sealed cell unit, the most obvious approach, in the absence of prior knowledge of established charging procedures, would be to rapidly charge the sealed cell unit through full charge and into overcharge to insure complete charging. This approach is impractical, however, because of internal pressurization—which could destroy the cell and possibly lead to injury. Grafham, cited above, discloses a circuit for charging at a rapid rate to a point approaching full charge and then charging at a low rate.

My circuit arrangement shown in FIG. 2 is an unobvious alternative to Grafham's approach. Further, my circuits in all instances allow a much closer approach to full charge of a sealed cell unit at a rapid charge rate. For sealed cell units which cannot tolerate overcharge my circuits permit utilization of a much larger percentage of total cell capacity, and for sealed cell units which can tolerate overcharge at low rates, my circuits significantly reduce total charge time to reach full charge.

In utilization of the circuitry of FIG. 2, the sealed cell unit 102 is initially connected to positive and negative terminals 104 and 108, as well as to monitoring terminal 106, in the manner indicated. The input terminals 120 and 122 of the high impedance transformer 118 is then electrically connected to an A-C power source. It can be seen that when the SCR 130 is turned on it will allow unidirectional flow of an electrical current representing a fraction of the total A-C current available from the output terminals of the transformer. Thus, when the SCR is turned on pulsed D-C current is supplied from the transformer output terminals through the SCR and reed switch current coil to charge the sealed cell unit at a rapid rate. It is noted that a current flow path is also provided in shunt with the SCR through the rectifier 144 and resistance 148 which are connected in series between the anode and cathode leads of the SCR. When the SCR is not firing, a current will continue to flow to the sealed cell unit. This current is low as compared to the current passing through the SCR, and the value of the current is controlled by choice of the value of resistance 148. Accordingly the electrical shunt connection between the rectifier cathode lead and the SCR cathode lead provides a trickle charge by-pass for charging the sealed cell unit at a slow rate after rapid charge has been terminated.

The potential level of the gate lead for the SCR determines whether or not the SCR acts to rectify or prevent current through it. During rapid charge the contacts 152 of the reed switch are normally open so that the D-C current supplied to the gate lead through the rectifier 144 and the resistance 142 maintain the gate lead at the proper potential with respect to the anode to permit firing. When, on the other hand, the gate lead is shorted to the cathode lead of the SCR, as by closing the contacts 152 of the reed switch, the potential of the gate and cathode leads are essentially identical, and the SCR cannot fire.

It is then apparent that the SCR acts as a rectifier and power control for the circuit while the reed switch contacts serve to control the SCR. During each current pulse the current coil produces a magnetic flux tending to maintain the contacts of the reed switch open. It is the voltage coil 154 of the reed switch that produces a flux tending to close the contacts of the reed switch. Except for the influence of the thermistors and resistances 158, 160, and 162, discussed below, it can be seen that the voltage coil of the reed switch is connected electrically in shunt with both the terminals of the sealed cell unit and the output terminals of the transformer. It is then apparent that during each D-C current pulses the voltage coil is provided with a potential thereacross reflective of the charging voltage applied to the sealed cell unit while between D-C charging pulses the potential across the voltage coil reflects the potential of the sealed cell unit.

It is an important and novel feature of my invention that only the net flux, that is, the difference between the fluxes of the current and voltage coils acts on the reed switch during charging pulses, whereas during the intervals between charging pulses the total flux output of the voltage coil is available for acting to close the contacts of the reed switch. This is an important feature, since it prevents premature termination of rapid charge. It is to the best of my knowledge a novel feature not incorporated in any other sealing cell charger. According to my invention the current coil preferably produces a flux value equal to or greater than the transient peak flux value produced by the voltage coil during charge current pulses. Accordingly, the contacts of the reed switch cannot be closed during charging pulses. This then eliminates any possibility of the reed switch contacts being closed by the charging potential or, more importantly, by a transient or cyclic voltage pulse superimposed on the charging potential. For example, the SCR will generate a voltage pulse each time it fires. If the current coil were eliminated from the circuit, this voltage pulse could cause premature termination of rapid charge. With the current coil in the circuit it is assured that the potential across the voltage coil in the interval between charging pulses will produce a larger net switch closing flux than can be generated during charging and that the closing potential of the switch will closely approximate the maximum desired potential of the sealed cell unit at the time of termination of rapid charge.

While it is appreciated that the advantages of my invention could be in part realized by merely connecting the voltage coil to the negative terminal of the sealed cell unit and eliminating the thermistors, resistances 158, 160, and 162, and the monitoring terminal 106, these latter elements also serve an important function in yielding an improved charging device. The thermistor 156 and resistance 158 together act to compensate for temperature related variations in the conductivity of the voltage coil. At least the thermistor 156 is mounted in thermally conductive relation with the voltage coil, and, preferably both the thermistor 156 and resistance 158 are packaged inside the reed switch unit 134. Whereas the resistance of the voltage coil will tend to increase with increased temperature, the negative thermal coefficient of resistivity of the thermistor will cause its resistance to drop with temperature increase. The use of the thermistor 156 and resistance 158 in parallel yield a circuit network that behaves similarly as a thermistor alone, but with a greater degree of linearity as regards the relationship of temperature and resistance.

The resistance 162 and thermistor 114 are provided to relate the maximum potential level of rapid charge of the sealed cell unit to the temperature thereof. It is recognized that the maximum potential level to which a sealed cell can be rapidly charged is a function of its temperature. In my circuitry the temperature of the cell is sensed and rapid charge is terminated as a function of both cell potential and temperature. Accordingly, my circuitry allows a rapid charge to be applied to very nearly the full charge capacity of a sealed cell unit under a wide variety of temperature conditions. The thermistor 114 and resistance 162 in parallel produce a net resistance relationship to temperature that more nearly approaches inverse proportionality. While the thermistor must be located in thermally conductive relation with the cells of the sealed cell unit and, hence, is preferably located within the sealed cell unit, the resistance 162, being less subject to temperature effects, need not be located in thermally conductive relation with the sealed cell unit, but may be incorporated as a part of the charging device. When the thermistor 114 is located inside the sealed cell unit, it is noted that it becomes a part of the sealed cell unit rather than the charging device.

Since it may be desirable to vary the maximum potential to be applied to a sealed cell unit during charge, a variable resistance 160 is provided between the terminals 106 and 138. As a safety feature, should the charging device for any reason fail to revert to the low charge rate short of overcharge, a fuse 112 is provided which will open the circuit within the cell unit as a function of temperature. Instead of a fuse it is also contemplated that a pressure sensitive switch may be incorporated within the sealed cell unit.

A full wave charging device allows for faster charging than is possible with the half wave version just described and, of course, allows better utilization of an alternating current power source. Adapting the circuit just described for full wave operation requires application of a full wave rectified voltage between output terminals 124 and 126. This may be accomplished by inserting a full wave rectifier between the alternating current terminals 120 and 122 and the output terminals 124 and 126.

A simple full wave rectifier for use with the circuit illustrated in FIG. 2 is set out in FIG. 3. The terminals which are to be connected to the alternating current source and the output terminals are given the same reference numerals as in the circuit of FIG. 1. In this instance, a transformer 234 having a center tap 235 on the secondary winding 236 is provided. The center tap terminal is connected directly to output terminal 126. Opposite ends of the secondary winding 236 are connected to the other input terminal 124 through rectifiers 237 and 238. These rectifiers are connected to pass current toward output terminal 124 and block current flow in the opposite direction. A rectified A-C voltage appears between output terminals 124 and 126 with both half cycles flowing to the remainder of the circuit. Thus, both half cycles are supplied with a polarity suitable for conduction by the SCR.

FIG. 4 is a circuit diagram illustrating an alternate charging device 400 and sealed cell unit 402 electrically connected through positive terminal 404, negative terminal 408, and monitoring terminal 406. The sealed cell unit 402 is provided with a plurality of cells 410 and a thermistor 414 analogous to the cells 110 and thermistor 114 of the sealed cell unit 102. The sealed cell unit differs from unit 102 by the optional omission of a fuse and the optional inclusion of a resistance 462 in shunt with the thermistor within the sealed cell unit rather than as a part of the charging device, as in the circuit of FIG. 2.

The charging device is provided with a transformer 418, similar to transformer 118, having input terminals 420 and 422 and output terminals 424 and 426. Terminal 426 is electrically connected to negative terminal 408. Terminal 424 is electrically connected to the anode lead of rectifier 444 which in turn has its cathode lead electrically connected to a first contact terminal 446. The normally closed contacts 450 of a solenoid operated switch or relay are connected between the fisrt contact terminal and a second contact terminal 448. The current coil 452 of a reed switch is electrically connected between the second contact terminal and the positive terminal of the sealed cell unit. Thus, the output terminal 424 is connected to the positive terminal 404 of the sealed cell unit in series relation with the rectifier, the normally closed contacts of a solenoid operated switch, and the current coil of a reed switch. As an optional feature, resistance 454 is electrically connected between the first and second contact terminals to by-pass the contacts of the solenoid switch and allow for trickle charge upon the termination of rapid charge.

A coil 456 for the normally closed solenoid or relay switch is electrically connected across the input terminals of the transformer in series with the contacts 458 of the reed switch. A voltage coil 460 of the reed switch is electrically connected to shunt the monitoring terminal and the positive terminal of the sealed cell unit. The normally closed solenoid operated switch is accordingly seen to be comprised of normally closed contacts 450 and solenoid coil 456. The solenoid operated switch is constructed so that the contacts 450 remain closed in the absence of any current through the solenoid coil.

The reed switch is comprised of the current coil 452, the voltage coil 460, and contacts 458. This reed switch differs in construction from the reed switch unit 134 previously described only in that the elements included to compensate for temperature related variations in conductivity of the voltage coil are in this instance omitted, these being an optional feature. For example, where the charging device is constructed with the elements lying in a well ventilated arrangement and/or low ambient temperatures of operation are contemplated, the voltage coil may not vary appreciably in temperature. In any event, variations in conductivity of the voltage coil may not interfere with the degree of charging control desired in many applications.

In operation of the charging device 400, a rapid charge is initially applied to the sealed cell unit 402 by connecting the sealed cell unit and the charging device through terminals 404, 406, and 408, as shown, and connecting the input terminals 420 and 422 of the transformer 418 to an A-C power source. D-C power pulses are initially transmitted between transformer output terminals 424 and 426 and through the cells 410 of the sealed cell unit through a conductive path leading through the rectifier 444, normally closed contacts 450, and current coil 452.

Termination of rapid charge is achieved by the net flux produced by the current coil and the oppositely wound voltage coil 460. As described above, it is a feature of my invention that the net flux produced acting to close the reed switch contacts 458 is a function of the potential across the cells 410 of the sealed cell unit rather than a function of the charging potential applied to the cells. The resistance 462 and thermistor 414 act together to modify the maximum voltage of the sealed cell unit at which termination of rapid charge is effected.

When the sealed cell unit has reached a predetermined temperature related state of charge, the voltage coil produces sufficient flux over and above that available in opposition from the current coil to close the contacts 458 of the reed switch. This then allows a current to pass between the terminals 420 and 422 of the transformer through the solenoid coil 456. Current through the solenoid coil opens the contacts 450 and breaks the current flow path between transformer output terminal 424 and 426. Where slow rate overcharge is desired, the resistance 454 provides for the trickle charge by-pass of the locked open contacts 450. Of course, if slow charge is not desired, then the resistance 454 may be omitted.

Figure 5:
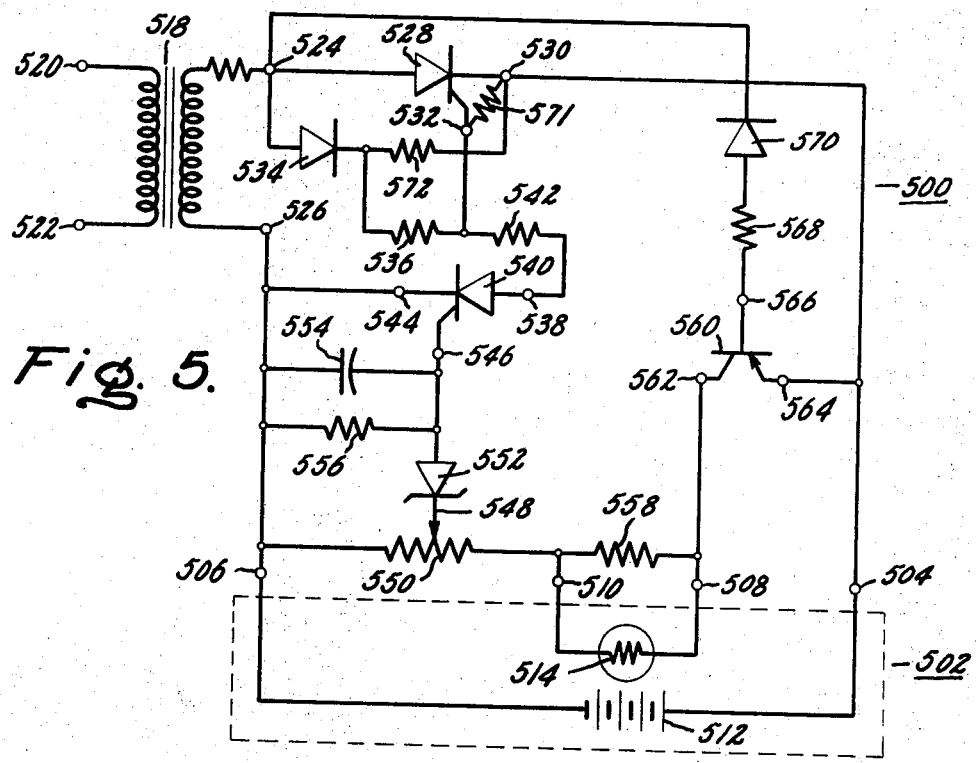
FIG. 5 is a circuit diagram illustrating another embodiment of the invention utilizing solid state circuit elements.

In the foregoing circuits the termination of rapid charge in each instance requires the incorporation of magnetic flux operated switches. To illustrate that the use of such switches are not essential to accomplish the purposes of my invention, FIG. 5 illustrates a charging device 500, which may be comprised entirely of solid-state circuit elements, electrically connected to a sealed cell unit 502 having a positive terminal 504, a negative terminal 506, and monitoring terminals 508 and 510. The positive and negative terminals provide an electrical connection across series related rechargeable cells 512 while the monitoring terminals provide an electrical connection across a thermistor 514 lying in thermally conductive relation with the cells.

The charging device is comprised of a high impedance transformer 518 similar to transformer 118 having input terminals 520 and 522 and output terminals 524 and 526. Terminals 526 is electrically connected to the negative terminal of the sealed cell unit while the terminal 524 is connected to the positive terminal of the sealed cell unit through a first SCR 528. The anode lead of the first SCR is connected to terminal 524 while the cathode lead is connected to cathode terminals 530. The cathode terminal is in turn connected to the positive sealed cell unit terminal. The first SCR is provided with a gate lead connected to gate terminal 532, which, when maintained at the proper potential with respect to the anode and cathode leads, permits electrical charging of the sealed cell unit at a rapid rate.

In order to hold the gate terminal of the first SCR at the correct potential for firing and hence to permit rapid charge, a rectifier 534 and resistance 536 are connected electrically in series betwen the anode lead of the first SCR and its gate terminal.

To prevent the first SCR from firing, a second SCR 540 is provided having its anode terminal 538 connected through resistance 542 to the gate terminal of the first SCR. The cathode terminal 544 of the second SCR is connected to the terminal 526. Thus, when the gate terminal 546 of the second SCR is maintained at the proper potential to allow the second SCR to fire, the gate terminal 532 of the first SCR is brought to a potential level so that the first SCR cannot be fired.

To control the potential of the gate terminal 546 of the second SCR and hence to selectively control firing of the second SCR, the gate terminal of the second SCR is connected to the voltage pick-off 548 of a potentiometer 550 through a Zener diode 552. As an optional stabilizing feature af capacitance 554 and a resistance 556 are connected in parallel between the terminal 546 and 526 so as to form an RC filter. The potentiometer is electrically connected between the negative terminal 506 and the monitoring terminal 510. It is noted that a divided current flow path is provided between monitoring terminals 508 and 510 through thermistor 514 in the sealed cell unit and resistance 558 shown incorporated in the charging device, but which may be located in the sealed cell unit, if desired. The monitoring terminal 508 is electrically connected to the positive terminal 504 through transistor 560. The collector terminal 562 of the transistor is connected to monitoring terminal 508 while the emitter terminal 564 is connected to positive terminal 504. Accordingly, when the base terminal 566 of the transistor is properly biased, the potentiometer is electrically connected across the positive and negative terminals of the sealed cell unit in series with the parallel network represented by the resistance 558 and thermistor 514.

The base terminal of the transistor is electrically connected to terminal 524 of the transformer in series with rectifier 570 and resistance 568. It is noted that the rectifier 570 is placed in the circuit so that it permits current flow of opposite polarity as that permitted by the rectifier 534. A resistance 571 is connected between terminals 532 and 530 to keep the second SCR turned on once it is fired. The circuit is completed by resistance 572 which electrically connects the cathode of the rectifier 534 with the cathode terminal of the first SCR to allow trickle charge bypass of the first SCR to provide a slow charge rate to the sealed cell unit.

In operation of the circuit of FIG. 5, initially the rectifier 534 and resistance 536 maintain the gate terminal 532 of the first SCR 528 at a proper potential to allow the first SCR to fire and to allow the sealed cell unit 502 to be charge at a rapid rate as a result of the pulsed D-C current passing through the first SCR.

During the non-charging portion of each A-C cycle, the rectifier 570 permits current to reach the base terminal 566 of the transistor 560 so that it is driven to its saturation conductivity between the collector terminal 562 and emitter terminal 564. While the transistor is thus conductive the potentiometer 550 senses the potential across the positive and negative terminals 504 and 506 of the sealed cell unit. This potential sensed is, of course, modified as a function of temperature by the influence of the parallel network represented by the resistance 558 and thermistor 514 in a manner described in detail in connection with the preceding charging circuits. It is important to note that again the potential across the sealed cell unit is being monitored in such a way that the potential across the sealed cell unit rather than the potential being applied to it is being sensed. Accordingly, premature termination of rapid charge is again being avoided.

The pick-off 548 of the potentiometer is adjusted so that when the temperature adjusted maximum potential is sensed across the terminals of the sealed cell unit, the reference voltage of the Zener diode 552 will be reached. Accordingly, at a predetermined temperature-related voltage the gate terminal 546 of the second SCR will be brought to the proper potential for firing of this SCR. When the second SCR fires, the potential of the gate terminal 532 of the first SCR is varied to a potential at which the first SCR cannot be fired. Accordingly rapid charge of the sealed cell unit is terminated, and continued charging in the circuit form shown is through resistance 572 and rectifier 534.

Figure 6:
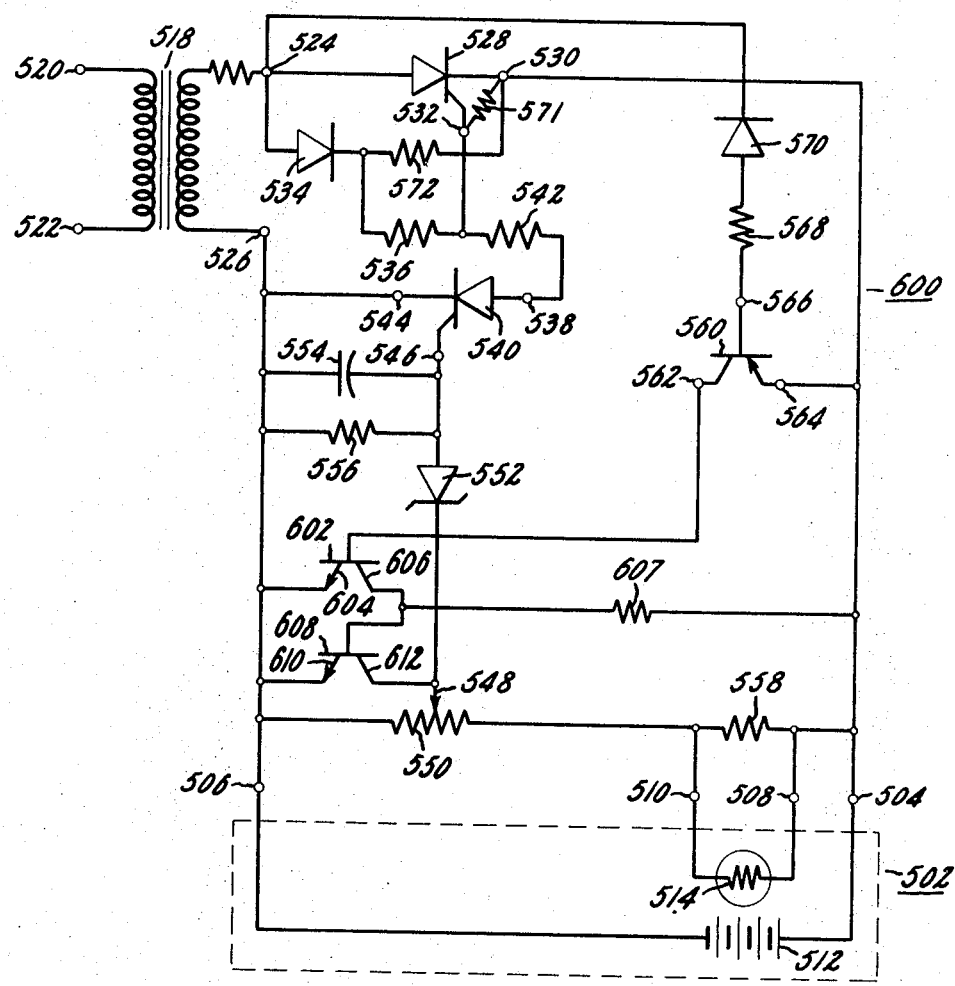
FIG. 6 is a circuit diagram illustrating a modification of the embodiment of FIG. 6.

In certain applications of my invention it may be desired to sense potential across the sealed cell unit without factoring in the anticipated potential appearing across the transistor at saturation conductivity. This might be desirable, for example, in charging a single cell unit, where the full charge potential is quite low. FIG. 6 illustrates a circuit variation which achieves this modification. Elements which are identical to those of the circuit of FIG. 5 are assigned like reference numerals and are not described in detail.

The charging device 600 differs from the charging device 500 in that the potentiometer 550 is connected directly across the positive and negative terminals 504 and 506 through resistance 558 and thermistor 514. While sealed cell unit 502 is shown again for simplicity, it is appreciated that terminals 508 and 504 could as well be a single terminal. The transistor 560 instead of being connected across the cell unit terminals through the potentiometer is connected with its collector terminal 562 electrically united to the base of transistor 602. The emitter 604 of transistor 602 is connected to negative terminal 506 while the collector 606 is electrically connected to the base of a third transistor 608. The collector and base of transistors 602 and 608, respectively, are electrically connected to the terminal 504 through a resistance 607. The emitter 610 of the third transistor is connected to the negative terminal while the collector 612 is conected to the pick-off lead of the potentiometer.

In use, the third transistor 608 is conductive between the collector 612 and emitter 610 when the first SCR is firing. Accordingly, the pick-off 548 of the potentiometer maintains the potential of the gate terminal 546 of the second SCR at substantially the potential of the cathode terminal 544. The second SCR is then prevented from firing regardless of the potential across the terminals of the sealed cell unit. During the non-charging portion of each A-C cycle, the transistor 560 is rendered conductive as previously described and renders the second transistor 602 conductive between the emitter 604 and collector 606. This brings the base potential of the third transistor to a level substantially equal to the potential of its emitter 610. The third transistor is thereby rendered non-conductive, and this in turn allows a potential to develop between the gate terminal 546 and cathode terminal 544 of the second SCR. Accordingly the second SCR may still be fired during the non-charging portion of any cycle. It can be seen then that the charging device 600 produces a similar result as the charging device 500, although through an alternate mechanism.

While I have described my invention with reference to certain specific circuits and circuit components, it is appreciated that numerous variations will readily occur to persons having ordinary skill in the art of charging sealed cell units. For example, while each of the sealed cell units is shown comprised of a plurality of series related cells, it is possible to apply my invention to a sealed unit formed of a single cell or a plurality of cells connected in parallel. My invention may be practiced with any conventional rechargeable cell unit. While each of my charging devices shows the incorporation of a transformer, this may be dispensed with if a suitable source of D-C power is otherwise available. Although I have for the sake of definiteness described my inventive circuits with reference to rectifiers, SCR's, transistors, and thermistors, it is appreciated that other electronic components are known capable of either duplicating or approximating the function of each of these elements and that these components may, if desired, be substituted for those described. For example, the use of reed switches, although preferred, is not required. Any switch controlled by oppositely wound current and voltage coils may be utilized. Although the use of thermistors and resistances in parallel to achieve near linear relationships between temperature and resistance is disclosed, it is appreciated that a thermistor may be used alone in many applications where an exact linear relationship is not required or where temperature variation is to be confined to a range in which a thermistor is capable of yielding a near linear relationship between these parameters. In all instances thermistors are shown incorporated within the sealed cell units. Nevertheless, it is not essential that the thermistors actually be placed within the housing of the sealed cell units. It is only necessary that the thermistors lie in a fixed thermal relationship to the sealed cell units so that the temperature of the sealed cell units will bear a known relationship to the temperature of the thermistors. It is accordingly intended that the scope of my invention be determined with reference to the following claims.

What I claim as new and desire to secure by Letters Patent of the United States is:

1. The combination comprising: a sealed secondary cell, means for supplying pulsed D-C power to said cell including signal responsive means for allowing rapid charge of said cell up to a battery voltage level related to the temperature of said cell, and means for supplying a signal to said rapid charge means indicative of the temperature-related cell voltage level including means connected across said cell in shunt with said power supplying means for supplying a signal to said rapid charge means upon sensing a predetermined potential, means lying in thermally conductive relation with said cell for adjusting the potential sensed by said signal supplying means as a function of temperature, and means for buffering said signal supplying means from the potential across said battery attributable to said power supplying means, magnetic flux operated switching means comprised of
   a current coil
   a voltage coil, and
   a pair of contacts controlled by said coils,
   said current coil forming part of said buffering means, and said voltage coil and said contacts forming part of said signal supplying means.

2. The combination according to claim 1 in which said switching means is a reed switch.

3. The combination comprising: a sealed secondary cell, means for supplying pulsed D-C power to said cell including signal responsive means for allowing rapid charge of said cell up to a battery voltage level related to the temperature of said cell, and means for supplying a signal to said rapid charge means indicative of the temperature-related cell voltage level including means connected across said cell in shunt with said power supplying means for supplying a signal to said rapid charge means upon sensing a predetremined potential, means lying in thermally conductive relation with said cell for adjusting the potential sensed by said signal supplying means as a function of temperature, and means for buffering said signal supplying means from the potential across said battery attributable to said power supplying means, said buffering means including means for cyclically reducing the conductivity of the shunt connection of said signal supplying means for the duration of each D-C power pulse, said conductivity reducing means being a solid state control means.

4. The combination according to claim 3 in which said control means is comprised of a rectifier and a transistor, said rectifier being attached to the base lead of said transistor.

5. The combination comprising: means for supplying pulsed D-C power to a battery of electrochemical secondary cells, including signal responsive means for allowing rapid charge of the battery up to a battery voltage level related to the temperature of the battery, means for supplying a signal to said rapid charge means indicative of the temperature-related battery voltage level including means connected across the battery in shunt with said power supplying means for supplying a signal to said rapid charge means, upon sensing a predetermined potential, temperature compensating means having a sensor lying in thermally conductive relation with said battery and arranged for adjusting the potential sensed by said signal supplying means as a function of temperature, means for buffering said signal supplying means from the potential across the battery attributable to said power supplying means, and magnetic flux operated switching means comprised of a current coil
    a voltage coil, and
    a pair of contacts controlled by said coils,
    said current coil forming part of said buffering means, and said voltage coil and said contacts forming part of said signal supplying means.

6. The combination comprising: means for supplying pulsed D-C power to a battery of electrochemical secondary cells, including signal responsive rapid charge means for allowing rapid charge of the battery up to a battery voltage level related to the temperature of the battery, means for supplying a signal to said rapid charge means indicative of the temperature-related battery voltage level, including means connected across the battery in shunt with said power supplying means for supplying a signal to said rapid charge means upon sensing a predetermined potential, temperature compensating means having a sensor lying in thermally conductive relation with the battery for adjusting the potential sensed by said signal supplying means as a function of temperature, and means for buffering said signal supplying means from the potential across the battery attributable to said power supplying means, said buffering means including means for cyclically reducing the conductivity of the shunt connection of said signal supplying means for the duration of each D-C power pulse, said conductivity reducing means being a solid state control means.

7. The combination according to claim 6, said control means comprising a transistor and a rectifier attached to the base lead of said transistor.

8. In a battery charger control system, the combination comprising:
(a) means for supplying a source of pulsed D-C current to a battery of electrochemical cells at a rapid charging rate, said pulsed current having intervals of zero charge current flow,
(b) signal responsive conducting means electrically communicating with said current source allowing flow of rapid charge current to the battery and arranged for cutting off the flow of rapid charge in response to a predetermined signal, and
(c) signal supplying means electrically communicating with said conducting means to transmit said predetermined signal thereto and including
   (1) means for open-circuit sensing of the voltage across the battery during intervals between pulses of current from said source,
   (2) means for modifying the voltage sensed across the battery in accordance with variations in battery temperature, and
   (3) means connected to said open-circuit voltage sensing means to prevent termination of rapid charge current from occurring as a result of battery voltage sensed during a current pulse.

9. The combination according to claim 8, said signal responsive conducting means including:
switching means arranged to be in electrical communication with the battery and with said source of current for controlling flow of rapid charge current from said current source to the battery to cut off said flow in response to a signal initiated by said open-circuit sensing means.

10. The combination according to claim 8, said switching means comprising a reed switch said signal supplying means further including magnetic flux means for operating said reed switch, comprising;
(a) a current coil arranged to urge said reed switch into open condition, and
(b) a voltage coil arranged to urge said reed switch into closed condition, said voltage coil being wound and arranged in relation to said reed switch so as to produce magnetic flux in a direction opposite to that of said current coil, so that during charging current pulses from said source the difference between the magnetic fluxes of said current coil and said voltage coil acts on said reed switch whereas during intervals between the charging pulses the total flux output of the voltage coil is available to urge the reed switch into closed condition.

11. The combination according to claim 10, further including a shunt related thermistor and resistance connected in a circuit arranged in series with said voltage coil to compensate for temperature related flux variations in said voltage coil.

12. The combination according to claim 8, further including means adapted to protect the battery so the latter can withstand low rate overvoltage, said current supplying means additionally including low rate charge means connected in shunt with said rapid charge means for actuation of trickle charge of the battery upon said response of said conducting means.

13. The combination according to claim 8, said means for modifying the open-circuit voltage sensed across the battery having a sensor member arranged in thermally conductive relation with the battery.

14. The combination according to claim 13, said sensor member including resistance means having a high negative thermal coefficient of resistivity, and a resistance electrically connected in parallel with said negative coefficient resistance means.

15. The combination according to claim 8, said source of pulsed D-C current including means for supplyying D-C power having pulsed voltage, said signal responsive conducting means being arranged for connection across the battery and in shunt with said power supplying means, and
buffering means electrically communicating with said power supplying means for cyclically reducing the conductivity of the shunt connection of said signal responsive conducting means for the duration of each D-C power pulse.

16. The combination according to claim 8, said source of pulsed D-C current including means for supplying D-C power having pulsed voltage, said signal responsive conducting means being a solid state control means.

17. The combination according to claim 16, further including a pair of input terminals arranged for connection to said voltage source, first and second series circuit branches connected in parallel with each other and each connected between said pair of input terminals so that said pulsed voltage is applied across each of said series circuit branches,
said solid state control means comprising: first and second solid state switch means each having anode, cathode and gate terminals, said gate terminals being arranged to determine conduction between anode and cathode terminals of said switch means, said switch means being arranged for supporting conduction for applied voltage which is positive at anode terminal relative to cathode terminal and for blocking current flow for applied voltage of the opposite polarity, said first series branch including said anode and cathode terminals of said solid state first switch means and having resistance means,
said second series circuit including said anode and cathode terminals of second switch means and a pair of monitoring terminals for connection to a unidirectional voltage source, a circuit connection between said gate terminal of said second switch means and said first series circuit branch thereby providing a circuit path between the anode and gate terminals of said second switch means which includes at least a part of the resistance means of said first series circuit branch, so that said second switch means is gate fired by a source voltage pulse, said second switch means being selectively controlled by said first switch means, a voltage comparator circuit connected between said monitoring terminals and between gate and cathode terminals of said first switch means which handles only a reference current, whereby said first switch means is rendered conductive upon initiation of a source voltage pulse of proper polarity for conduction when the battery-temperature compensated voltage applied at said monitoring terminals is above a predetermined level so that conduction at said second switch means is prevented when said first switch means conducts before the source voltage pulse has risen far enough to gate fire said second switch means.

18. The combination as defined in claim 17, wherein the said circuit connection between the gate terminal of said second switch and said first series circuit branch includes a rectifier poled to conduct current to the gate terminal and block current flow away from said gate terminal.

19. The combination as defined in claim 18, said first and second solid state switch means each being an SCR.

20. In a battery charger control circuit, the combination comprising:
(a) a source of electrical power, and a first circuit including rectifier means connected to said power source for delivering at source of pulsating rapid charge current having intervals of zero current flow,
(b) means including a rapid charge output terminal for connecting said source of rapid charge current to a battery of electrochemical cells for charging,
(c) switch means connected between said source of rapid charge current and said output terminal for initially passing the rapid charge current to the battery and for latching said switch means into off condition upon receipt by said switch means of a predetermined signal,
(d) means for sensing between pulses of rapid charge current the voltage across the battery being charged and including temperature compensating means for modifying the sensed battery voltage in accordance with battery temperature so as to provide a temperature-modified battery voltage,
(e) a reference voltage source for comparison with said temperature-modified battery voltage,
(f) comparator means operably connected to said switch means for delivering thereto an output signal when said temperature-modified battery voltage exceeds the reference voltage,
(g) current transducer means connected to said source of rapid charge current for transforming instantaneous charge current magnitude to a singal usable in said switch means,
(h) said switch means including gate means for restricting response of said comparator means so that the latter acts to terminate the rapid charge current only during intervals of zero charge current flow.

21. The combination according to claim 20, further including a by-pass trickle-charge circuit connected in shunt across said switch means for supplying continuous low rate current to the battery.

References Cited

UNITED STATES PATENTS

| | | | |
|---|---|---|---|
| 1,597,315 | 8/1926 | Hulse | 320—32 |
| 2,366,992 | 1/1945 | Willing et al. | 320—39 X |
| 2,826,705 | 3/1958 | Lichtenfels et al. | 307—64 X |
| 3,296,516 | 1/1967 | Paine et al. | 320—35 |
| 3,355,651 | 11/1967 | Olson | 320—31 |
| 3,363,162 | 1/1968 | Bawden | 320—27 |
| 3,143,640 | 8/1964 | Becker | 219—494 |
| 3,242,411 | 3/1966 | Lilienfeld | 320—40 X |

J D MILLER, Primary Examiner

J. M. GUNTHER, Assistant Examiner

U.S. Cl. X.R.

317—155.5; 320—22, 35, 39